(12) United States Patent
Klöfer et al.

(10) Patent No.: US 7,095,365 B2
(45) Date of Patent: Aug. 22, 2006

(54) APPARATUS FOR MONITORING A FIELD DEVICE

(75) Inventors: Peter Klöfer, Steinen (DE); Volker Dreyer, Lörrach (DE); Sergej Lopatin, Lörrach (DE); Roland Müller, Steinen (DE); Herbert Schroth, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 144 days.

(21) Appl. No.: 10/868,950

(22) Filed: Jun. 17, 2004

(65) Prior Publication Data
US 2005/0017896 A1     Jan. 27, 2005

(30) Foreign Application Priority Data
Jun. 17, 2003 (DE) ................................ 103 27 499
Nov. 26, 2003 (DE) ................................ 103 55 784

(51) Int. Cl.
*G01S 13/08* (2006.01)

(52) U.S. Cl. .................... 342/124; 342/175; 73/290 R; 340/612

(58) Field of Classification Search ................ 342/124, 342/175; 73/290 R; 340/603–626
See application file for complete search history.

(56) References Cited

U.S. PATENT DOCUMENTS

| | | | | |
|---|---|---|---|---|
| 4,670,754 A | * | 6/1987 | Zacchio | 342/124 |
| 5,351,036 A | * | 9/1994 | Brown et al. | 340/618 |
| 5,406,842 A | * | 4/1995 | Locke | 73/290 R |
| 5,594,449 A | * | 1/1997 | Otto | 342/124 |
| 5,872,494 A | * | 2/1999 | Palan et al. | 333/252 |
| 6,107,957 A | * | 8/2000 | Cramer et al. | 342/124 |
| 6,337,655 B1 | * | 1/2002 | Wilkie et al. | 342/124 |
| 6,404,382 B1 | * | 6/2002 | Fehrenbach et al. | 342/124 |
| 2003/0233875 A1 | * | 12/2003 | Stehman et al. | 73/304 C |

FOREIGN PATENT DOCUMENTS

| | | |
|---|---|---|
| DE | 199 16 953 A1 | 11/2000 |
| DE | 19925185 | 12/2000 |
| DE | 10217349 | 2/2003 |

(Continued)

OTHER PUBLICATIONS

"Close range radar sensor for measurement of sugar-cane level inside a chute", Woods, G.S.; Maskell, D.L.; Jurd, B. Microwave Conference, 2000 Asia-Pacific 2000 pp.: 108-111.*

(Continued)

*Primary Examiner*—John B. Sotomayor
(74) *Attorney, Agent, or Firm*—Bacon & Thomas

(57) ABSTRACT

The invention relates to an apparatus for monitoring a field device for determining and/or monitoring a physical and/or chemical process parameter of a process medium with a first sealing stage facing toward the process and at least one housing with a predetermined interior volume. The housing is located on the side of the first sealing stage facing away from the process, wherein energy is transferable through the first sealing stage 4 in the direction of the process medium. This energy interacts with the process medium, wherein at least one detector unit is provided in the housing, which unit monitors at least one condition parameter of the interior volume of the housing. A control/evaluation device determines, on the basis of the energy interacting with the process medium, the physical and/or chemical process parameter, and wherein the control/evaluation unit and/or another monitoring unit recognizes and/or seals off and/or issues an alarm, on the basis of the monitored condition parameter in the interior volume of the housing, as soon as the monitored condition parameter in the interior volume of the housing a predetermined limit value.

16 Claims, 7 Drawing Sheets

FOREIGN PATENT DOCUMENTS

| | | |
|---|---|---|
| EP | 0 457 231 B1 | 11/1991 |
| EP | 0 464 529 B1 | 1/1992 |
| EP | 1 046 888 A1 | 10/2000 |

OTHER PUBLICATIONS

"Application of state-space frequency estimation to a 24-GHz FMCW tank level gauging system", Gulden, P.; Vossiek, M.; Pichler, M.; Stelzer, A. Microwave Conference. 33rd European vol. 3, Oct. 7-9, 2003 p.: 955-998.*

"Probe With PEEK Stands Up to Saturated Steam", Hope Molinaro. Plastics Engineering. Brookfield Center: Dec. 2004. vol. 60, Iss. 12; p. 34 (1 page).*

"Application of broadband radar to volumetric sensing and distance measurement", Hugh Burchett, Miles Upton. Sensor Review. Bradford: 1998, vol. 18, Iss. 2; p. 111 (pp. 1-5).*

* cited by examiner

APPARATUS FOR MONITORING A FIELD DEVICE

This application claims priority to German Patent Application No. 10327499.5, filed Jun. 17, 2003 and German Patent Application No. 10355784,9, filed Nov. 26, 2003.

FIELD OF THE INVENTION

The invention concerns an apparatus for monitoring a field device for determining and/or monitoring a physical and/or chemical process parameter of a process medium.

BACKGROUND OF THE INVENTION

For detecting the limit level of liquids or bulk materials in containers, capacitive measuring equipment or vibration systems are installed. In addition to these limit level detectors, which signal the attainment of a predetermined fill level as soon as they come into contact with the process medium, there are contactlessly working measuring systems, which, as measuring radiation, use ultrasonic waves, microwaves—or in especially critical applications—radioactive radiation. With the exception of the vibration systems, the aforementioned measuring devices are naturally also suited for the continuous measurement of the fill level of a process medium in a container.

The measuring devices are normally sealed against the process. Depending on the application, it may be necessary to securely and reliably encapsulate the measuring device against the process and/or from a remote control station. This sealing or encapsulation is especially important when the atmosphere in the container is an aggressive or explosive one. If, for example, an explosive gas mixture penetrates into the housing of the measuring device, then, through direct contact with the electrical or electronic components of the measuring device, an acute danger of explosion exists. Furthermore, a measuring device is normally connected to a remote control station by means of connecting lines. If the measuring device is not encapsulated, then it cannot be ruled out that the explosive, aggressive, or toxic gas mixture will escape through the lines into the remote control station and do harm there.

SUMMARY OF THE INVENTION

An object of the invention is to provide a fill-level measuring device for application in hazardous and critical areas.

The object is achieved by means of an apparatus, described as follows: A first sealing stage facing toward the process and at least one housing with a predetermined interior volume are provided, with the housing being arranged on the side of the sealing stage facing away from the process; energy is transferred over the first sealing stage in the direction of the process medium and interacts with the process medium; in the housing at least one detector unit is provided, which monitors at least one condition-parameter of the interior volume of the housing; a control/evaluation unit determines the physical or chemical parameter on the basis of the energy interacting with the medium; the control/evaluation and/or other monitoring unit recognizes and/or reports, on the basis of the monitored condition-parameter in the interior volume of the housing, whether the sealing stage is sealing the housing against the process; an alarm is issued as soon as the monitored condition-parameter in the interior of the housing reaches a predetermined limit value. The above-mentioned, other monitoring unit can be, e.g., a so-called bursting disc. This responds e.g. when increased pressure in the housing results due to a leakage.

In principle, a wide variety of units can be used as the detector unit. Preferably humidity, pressure, or gas concentration is monitored in the interior of the housing. In order that a measuring device can be operated over a two-wire line, its power consumption, and with it also the power consumption of the detector unit, must be low. Thus, ideally a passive detector unit, e.g. the above-mentioned bursting disc, is used.

In order that a leakage can also be directly reported, it is e.g. provided additionally that a movably-arranged component is displaced by means of the rising pressure in the housing. This displacement can be used for reporting directly on site. Alternatively an electrical evaluation is also possible for this, for example by using a reed relay or another proximity switch, which reports to the operator the Okay-condition or a critical condition, as the case may be, even at a remote location.

An advantage of the invention is seen especially in the feature that the apparatus remains functional even when the detector unit is responding. This is then especially possible when the housing with the detector unit is placed in front of the actual transmitter or the control/evaluation unit. Especially advantageous in this connection is, in addition, the use of a second sealing stage, which is arranged in front of the electronics, and protects such from the flow of the process medium in case of failure of the first sealing stage. The second sealing stage will be addressed in detail below.

The first sealing stage can be e.g. a plastic pot (in the case of radar or ultrasonic measuring devices), a metal diaphragm (in the case of vibration limit switches), a stuffing box packing or a metal ring-seal (in the case of radar, TDR or capacitive measuring devices in high-temperature zones), a glass bushing (in the case of TDR or capacitive measuring devices), or an elastomer seal (for all types of measuring devices).

A wide variety of units can be used as the detector unit. Preferably humidity, pressure, or gas concentration is monitored in the interior of the housing. In the case of two-wire measuring devices, the power-consumption of the detector unit must be low. Thus, ideally a passive detector unit is used. For example, a movably-arranged component is simply displaced by the rising pressure in the housing, or a reed relay is activated.

In accordance with an advantageous development of the apparatus of the invention, the housing is provided between the first sealing stage and transmitter, in which at least one electric and/or electronic component of the field device is arranged. Preferably the control/evaluation unit corresponds to the transmitter. Furthermore, for the incorporation of the at least one electric and/or electronic component of the field device, it is provided that the housing and the transmitter are connected with each other over a connecting line.

The housing is especially formed such that it separates or displaces the transmitter from the sensor for registering a physical and/or chemical process parameter, or from the process, as the case may be. In accordance with one embodiment, the housing is a connecting tube. In principle, however, in this case it can be any arbitrarily-formed hollow space.

In accordance with an advantageous development of the apparatus of the invention, the first sealing stage is arranged in the end-region of the housing that faces the process; in addition, a second sealing stage is provided in the end-region of the housing that faces away from the process. With the exception of the metal diaphragm or plastic pot, all types of seals can be used for the second sealing stage as can also be used for the first sealing stage. However, preferably a glass bushing is used, because here the possibility exists to pass the electrical supply lines and/or the signal lines through such gas-tightly. Furthermore, a threaded cable connector or a sealed conduit (conduit seal) can be used as the second sealing stage. In the case of conventional wiring with conductors, a threaded cable connector is preferably used, since it is very cost-effective. The demands on the second sealing stage are not then especially large when the housing is ventilated using a semi-permeable filter (e.g. Gore Tex). Then, according to current standards, the second sealing stage, the threaded cable connector, must sustain only 150% of the maximum pressure in the housing for approx. one minute without visible leakage Alternatively, a conduit seal can be used as the second sealing stage. The conduit seal is a pipe piece within the electrical conduit network that is cast and is prescribed according to national standards as a flame penetration barrier in areas with explosive atmospheres. If here, commensurate with the current state of the art, no detector unit is present, then, according to different national standards, the piping must additionally be gas-tight to the process. However in terms of safety technology, the conduit seals, which are being installed anyway, are not considered to be gas-tight. Thus, with the current practice of using conduit seals to seal the piping, the safety standards already in effect are still not met. With an aforementioned "Dual Seal Device" the requirement for gas-tightness does not apply, whereby the electrical installation is significantly simplified.

In particular, the housing can be the transmitter, in which the at least one electrical and/or electronic component of the field device is arranged. It is furthermore provided that the second sealing stage is arranged between the transmitter and a remote control station. In connection with the apparatus of the invention, it is considered to be especially favorable when the first sealing stage and/or the second sealing stage are/is constructed to be gas-tight.

An advantageous embodiment of the apparatus of the invention provides that the detector unit is integrated into the housing, transmitter or connecting tube.

The detector unit is especially developed as an add-on module, which is adaptable to the housing, transmitter, or connecting tube.

An advantageous embodiment of the apparatus of the invention is one in which at least one part of the transmitter, housing, or connecting tube is under negative pressure, with the detector unit being a pressure-measuring device, a vacuum switch, and/or a pressure switch. Negative pressure is a pressure relative to the ambient pressure of the process. Preferably it is a vacuum. The embodiment has the advantage that the incidence of corrosion leads to an increase in pressure. Thus it is not required for the alarm that medium penetrates, and thus no particular coordination of detector unit and medium is necessary.

A further advantageous embodiment of the apparatus of the invention provides that at least one part of the transmitter, housing, or connecting tube is under positive pressure, with the detector unit being a pressure-measuring device and/or a pressure switch. The housing is under positive pressure relative to the ambient pressure of the process. Positive pressure is a pressure which lies above the maximum allowable process pressure, for which the field device is designed, in order that a decrease in pressure can be measured in the case of a leakage. The positive pressure compared with the negative pressure has the advantage, that no gas can be drawn-in through the leakage.

In both of the above embodiments, the pressure condition in the housing, transmitter, or connecting tube is monitored by means of a pressure switch or a vacuum switch, depending on the preset pressure. If the pressure changes due to a leakage in the first sealing stage, then an alarm is initiated, without e.g. gas already penetrating into the housing. An advantage of this embodiment is that it is largely independent of the prevailing parameters in the process, such as e.g. conductivity, temperature, or dielectric constant of the medium. If the housing is under positive pressure, then a variation can be that there are two predetermined pressure regions which lead to an alarm. One is the pressure region below the preset positive pressure, the other the region on the upper side of a predetermined threshold above the positive pressure. The latter limit value for issuing the alarm refers to when, e.g., through corrosion, a leak results, and when, in the process, a pressure above the allowed value for the measuring device prevails.

An advantageous embodiment is one in which, in the detector unit, a movable unit is provided, which moves out of its rest position as soon as the monitored condition-parameter in the interior volume of the transmitter, housing, or connecting tube reaches a predetermined limit value. It can be, for example, a piston, which is attached to a spring. If corrosion occurs at a sealing stage, then pressure penetrates into the housing, transmitter, or connecting tube, and the piston is moved e.g. in a cylinder—in this case, it can be the connecting tube itself—or in a bore. The movement can then be detected by a proximity switch, a simple contact, or a relay. This embodiment of the detector unit is a very simple one, which, above all, requires very little electrical power.

An advantageous embodiment provides that a part of the transmitter, housing, or connecting tube and the detector unit form a modular unit. If, for example, the detector unit and control/evaluation unit are connected with one another by means of a connecting tube, then the modular unit of connecting tube and detector unit can be mounted, e.g. welded, at a suitable place in this connecting tube. For this, then, corresponding seals are required. These sealings of the modular unit can supplement the first and second sealing stages, or depending on construction, can replace one or both of the sealing stages. The modular unit is especially relevant when the housing, transmitter, or connecting tube is under positive pressure, and yet the electronics, e.g. the control/evaluation unit, are not designed for such a pressure. Thus, by means of this modular, encapsulated unit, an additional seal is also obtained in front of the control/evaluation unit. However, in the construction of the modular unit and the method of attachment, it must be assured that, in the case of a leakage in the first sealing stage, there is only the one route, through the modular unit, available; that is, no detour around the modular unit must be present and/or possible. Such a modular unit furthermore has the advantage, that field devices can be additionally equipped with it, in that such a modular unit e.g. is mounted into a normal connecting tube. Furthermore, there is the advantage, that e.g. a negative or positive pressure need not be produced in an entire connecting tube or an entire housing of the field device. The modular unit thus enables the upgrading of a field device, and simplifies the technical conversion.

An advantageous embodiment is one in which an intermediate medium is located at least in a part of the transmitter, housing, and/or connecting tube, which medium differs from the media located within the container, espe cially the process medium, and the detector unit is constructed such that it monitors the intermediate medium. Thus, the idea is that a medium is located in the housing, which medium differs from the media outside of the container, and also preferably outside of the housing itself. Thus, preferably this intermediate medium is not present outside of the field device, at least not outside of the container. If a leakage forms in one of the sealing stages, then the intermediate medium will escape, or it will mix with the penetrating medium, e.g. the process medium or a gas mixture formed in the container. If the intermediate medium generally is not present outside of the housing, transmitter, or connecting tube, then the leakages, which lead to a medium outside of the container penetrating into the field device, are also monitored. The detector unit is constructed such that it specially monitors this intermediate medium, its presence, its physical or chemical composition. If the intermediate medium escapes, then the intensity measured by the detector unit is reduced. Thus the detector unit monitors the intermediate medium, and in case of changes, issues an alarm. The way in which the intermediate medium differs from the possible media located in the container is thus determined by the type and construction of the detector unit, or, conversely, the detector unit must be chosen such that it can differentiate between the intermediate medium and the media—thus the actual process medium and possible gas mixtures—in the container.

An advantageous embodiment provides that the intermediate medium is a gas, and that the detector unit is a corresponding gas-sensor. Thus, the idea is that the interior of the housing is filled with a gas, e.g. carbon monoxide, carbon dioxide, methane, or ethylene, and that e.g. the gas concentration is monitored with a gas-sensor. As the gas-sensor, a semiconductor gas-sensor or an optical (infrared) MEMS gas-sensor or a crystal oscillator (bending oscillator or SAW-resonator with sensitive coating) can be used. The gas-sensor continuously monitors the gas concentration in the intermediate space and provides an alarm when this concentration changes due to a possible leakage. Infrared sensors, which can selectively sense certain gases, offer particular advantages. Using these sensors, the interior space is monitored chemically rather than physically.

Furthermore, the discharge voltage of the sensor remains high and defined, which is important for the standards requirements in the case of Ex-devices. In addition, the embodiment is suitable for any process pressure: If the process pressure is lower than the pressure in the interior of the housing, then the gas is drawn out of the interior through the leakage. In the case that the pressure is higher, the gas is compressed and mixed with the penetrating gas. Thus e.g. the absorption in the infrared-spectrum at signature wavelengths is changed. This embodiment is especially connected with the embodiment in which the sealing stages are gas-tight. In general, the properties of the intermediate medium, which in this case is a gas, are thus monitored spectroscopically.

Corresponding gas-sensors can operate, for example, according to the transit-time method of surface acoustic waves in so-called SAW-sensors, in which method the transit-time of surface acoustic waves in a gas-sensitive film is compared with the transit-time in a reference film. A corresponding apparatus, for example, is described in the international patent application WO 83/015111. Such apparatuses, for example, are suitable for the detection of hydrogen sulfide or mercury vapor. A SAW-sensor for the detection of mercury vapor, for example, is described in the U.S. Pat. No. 5,992,215.

A semiconductor gas-sensor on the basis of a gas-sensitive field-effect transistor is disclosed in the German Patent DE 199 58 311. Another field-effect transistor, which determines ammonia and ammonia derivatives according to the principle of measuring the work function, is described in the German Patent DE 199 26 747.

In addition to the disclosed gas-sensors in the named texts, the so-called "Karlsruhe Micronose," which implements conductivity measurements on segmented metal oxide films for gas-sensor purposes, is also suitable as a contamination sensor. Details for this are to be found, for example, on the Internet under the keyword "Karlsruhe Micronose" (Karlsruher Mikronase).

The electronic nose, developed by the IBM research laboratory Goschnick, having a multitude of microscopic bending bellows, which selectively bond certain gases, enables a determination of the composition of the bonded gas from the comparative analyses of mechanical changes of the respective bending bellows. The Frauenhofer ITM is a suitable semiconductor gas-sensor with monolithically-integrated CMOS-circuits.

For applications in environments where there is danger of explosion, one skilled in the art will select a gas-sensor which functions at low operating temperatures, especially room temperature. For this, SAW-sensors, among others, are suitable. Corresponding SAW-sensors, which are based on CMOS-silicon-technology, and a piezoelectric layer with ZnO, are described, for example, by Bender and Mokwa of the Institute for Materials in Electrical Engineering of the RWTH (Rheinisch-Wesffaelische Technische Hochschule) Aachen, in an article with the title "Temperature Stabilized Silicon Based Surface-Acoustic-Wave Gas Sensors for the Detection of Solvent Vapours," which can be accessed on the Internet under "www.iwe.rwth-aachen.de/iwe1/Publikationen/98-02s.pdf."

BRIEF DESCRIPTION OF THE DRAWINGS

The invention will now be explained in greater detail on the basis of the drawings, whose figures show as follows.

DETAILED DESCRIPTION OF THE PREFERRED EMBODIMENTS

Figure 1:
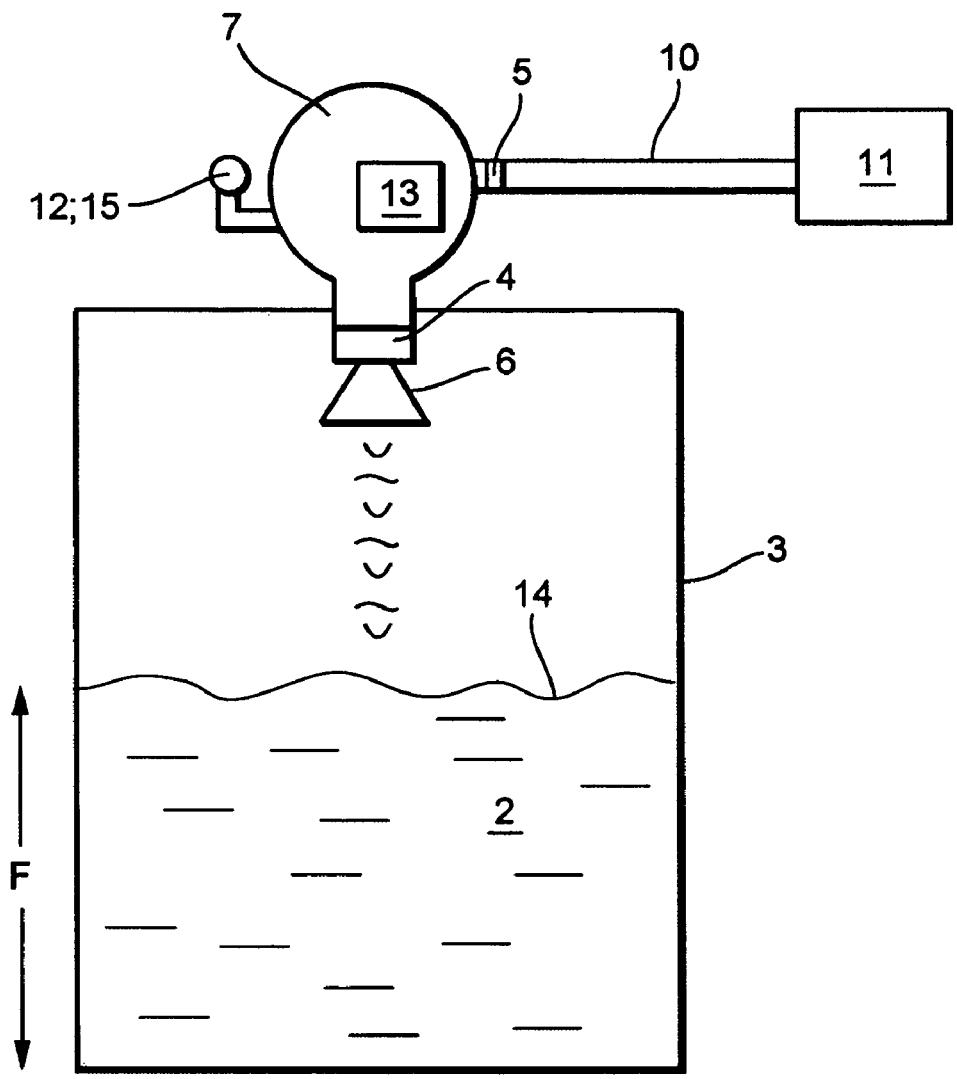
FIG. 1: a schematic representation of a first embodiment of the apparatus according to the invention.

FIG. 1 shows mounted on the top of a container 3 a fill level measuring device 1, which works with radar. Electromagnetic measuring signals are emitted from the antenna 6 in the direction of the surface 14 of the process medium 2; the echoed measuring signals reflected on the surface 14 of the process medium 2 are received by the antenna 6. The control/evaluation unit 13 determines the travel distance of the measuring signals on the basis of their travel time, and, for known height of the container 3, the current fill-level F of the process medium 2 in the container 3. The control/evaluation unit 13 is arranged in the transmitter 7.

In the embodiment shown in FIG. 1, two sealing stages 4, 5 are used. The first sealing stage 4 seals the transmitter 7, with the sensitive electronic components, against the process. Preferably one of the sealing stages already described in detail above is used. The sealing stage 4 should ensure that no aggressive, toxic, or explosive container atmosphere penetrates into the housing of the transmitter 7. In particular, this sealing stage 4 is therefore constructed to be gas-tight. Especially in the case of a gas-tight embodiment, the sealing stage is a glass bushing.

As aging occurs, it cannot be ruled out that the sealing stage 4 will lose its sealing ability. In order to recognize a penetration of process atmosphere or process medium 2 into the interior of the transmitter 7 in time, that is, to recognize it early enough so that the measuring device 1 does not fail, a detector unit 12 is assigned to the transmitter 7, which detector unit recognizes, on the basis of a changing gas concentration, a changing humidity, or a changing interior pressure, whether the transmitter 7 has a leakage. In the example shown, the detector unit 12 is adapted as an add-on module 15 onto the transmitter 7. As soon as a leakage occurs, such is reported to the operator so that appropriate countermeasures can promptly be taken.

The transmitter 7 is connected with a remote control station 11 over a connecting line 10. In order to ensure that, in the case of a leakage of the first sealing stage 4, no container-atmosphere will escape into the control station 11 over the connecting line 10, a second sealing stage 5 is provided. This sealing stage can be constructed as is already described in detail above. Using this redundant design of the sealing stages, the control station 11 is protected quasi twice as securely from penetration of container atmosphere. This redundant sealing protection, including the additional detector unit 12, offers a maximum possible measure of safety and thereby meets highest safety standards. Also referenced in this connection is the ISA-Standard 12.27.01 "Requirements for Process Sealing between Electrical Systems and Potentially Flammable Process Fluids."

Figure 2:
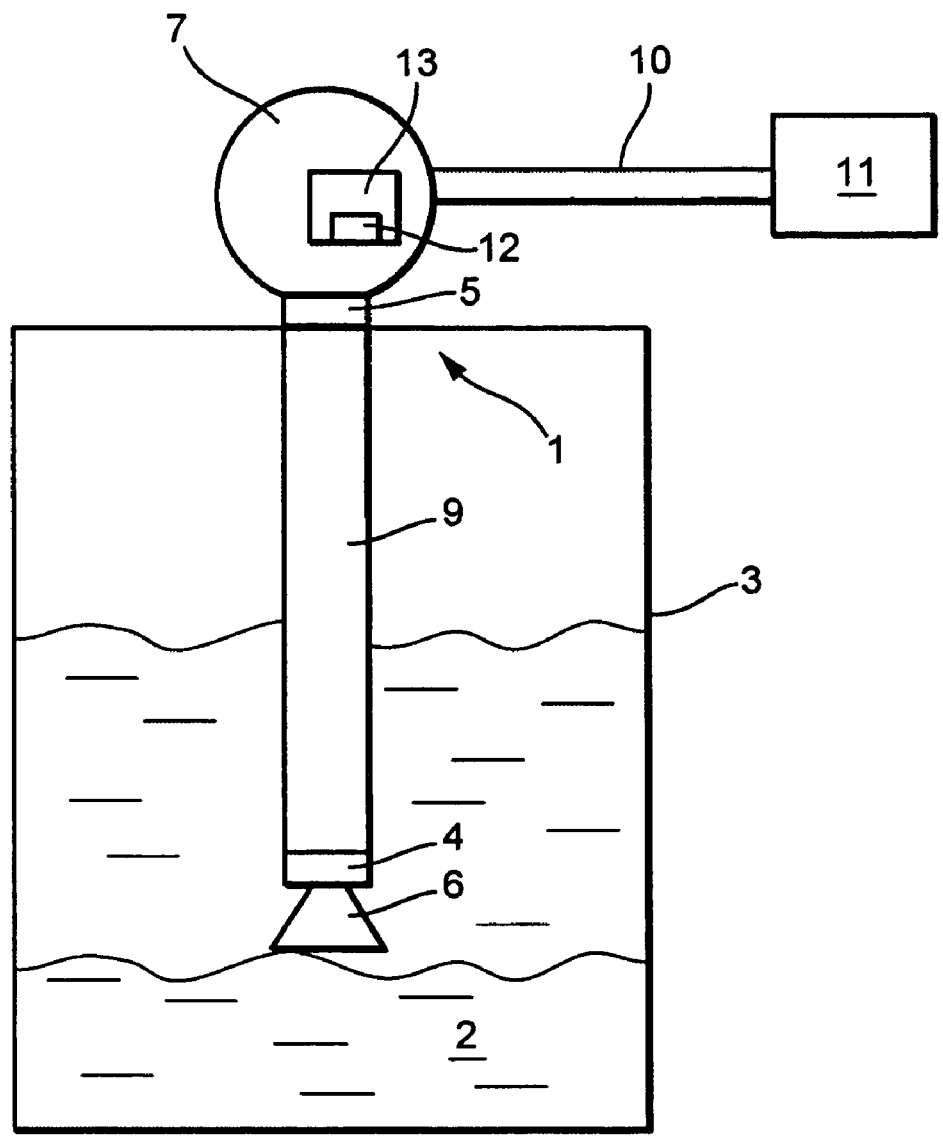
FIG. 2: a schematic representation of a second embodiment of the apparatus according to the invention.

FIG. 2 relates to a second advantageous embodiment of the apparatus according to the invention. In the case of the field device, it is a vibration detector or a vibration limit switch. For the purpose of recognizing the attainment of a predetermined fill level, vibration detectors utilize the effect that the oscillation frequency, especially the resonance frequency, of an oscillatable unit changes depending on whether the oscillation occurs in air/gas or in the solid or liquid process medium 2.

In order that the fill level in the lower region of the container 3 can be monitored, the oscillatable unit 6 is secured on the lower end of the connecting tube 9. For the purpose of the redundant separation of the transmitter 7 from the process, a first sealing stage 4 and a second sealing stage 5 are arranged in the lower and upper regions of the connecting tube 9.

In addition, by means of the detector unit 12, it is recognizable whether a leakage is present at the transmitter 7, despite both of the sealing stages 4, 5 constructed as redundant safety measures. In the case shown, the detector unit 12 is integrated in the control/evaluation unit 13.

Figure 3:
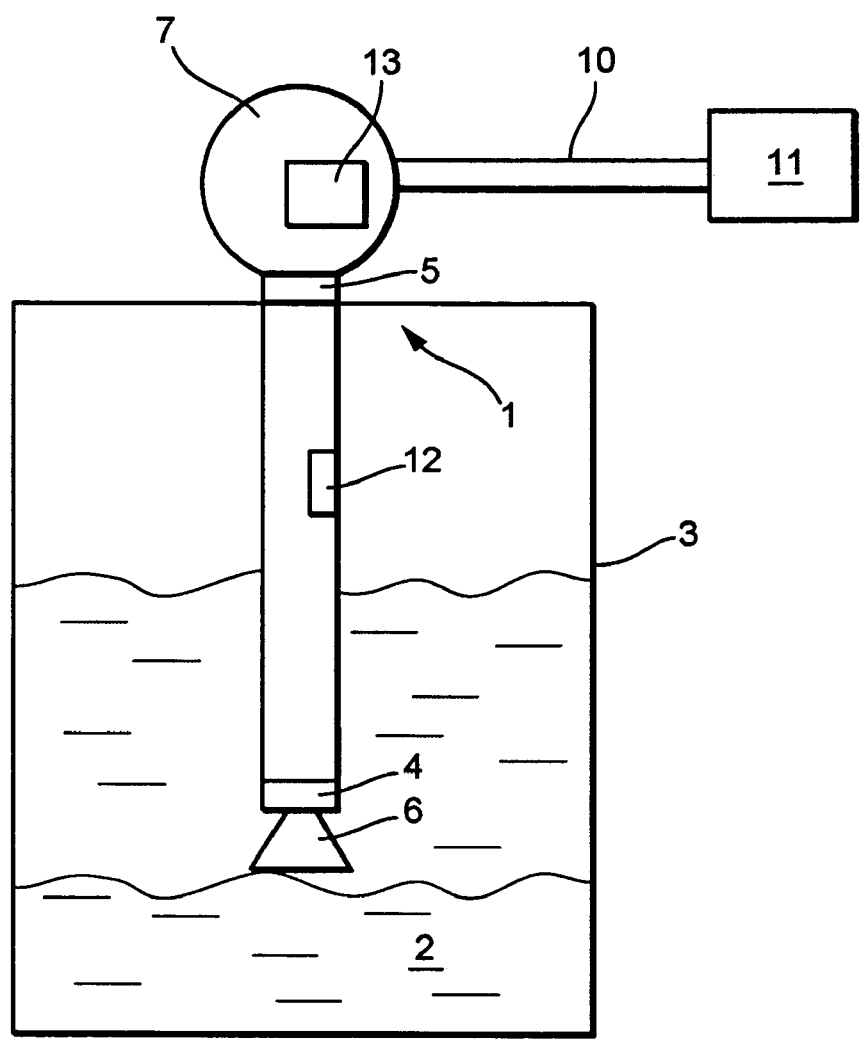
FIG. 3: a schematic representation of a third embodiment of the apparatus according to the invention.

The embodiment shown in FIG. 3 differs from that shown in FIG. 2 in that here the detector unit 12 is provided in the connecting tube 9 and not in the transmitter 7. Thus the detector unit 12 already responds in the case of a failure of the first sealing stage 4.

Figure 4:
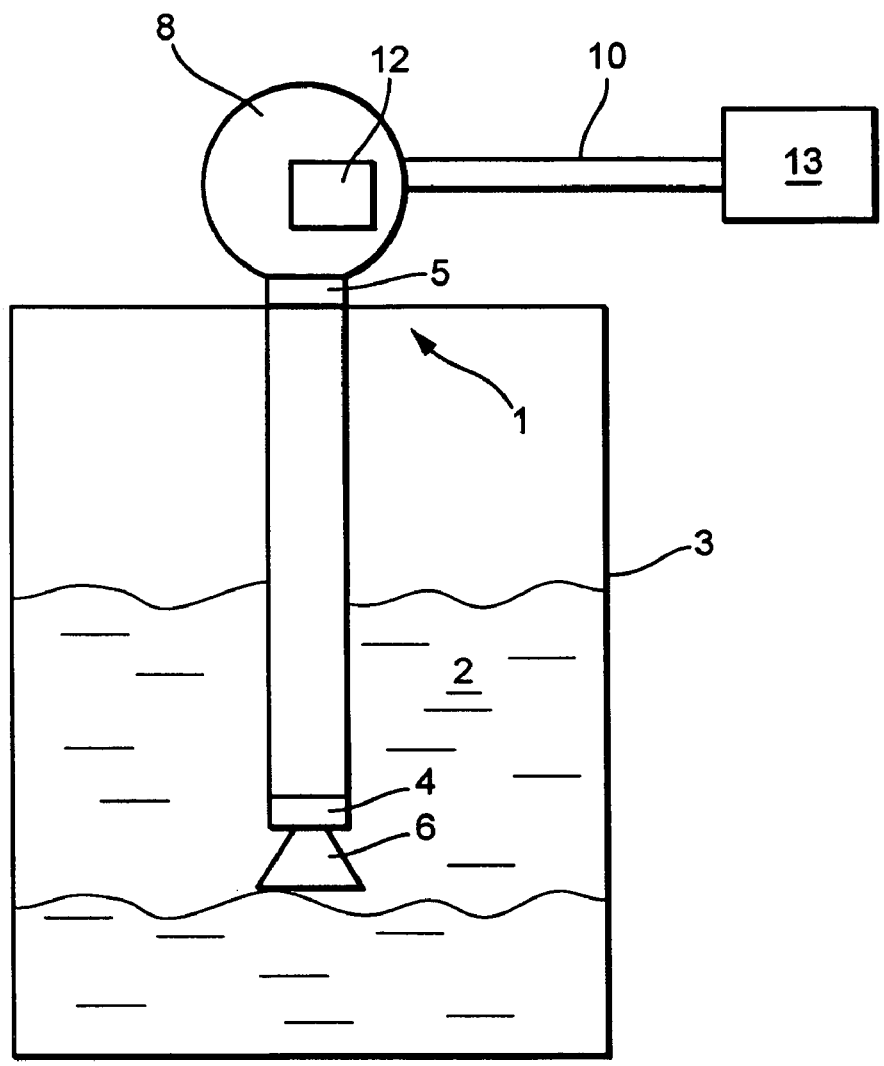
FIG. 4: a schematic representation of a fourth embodiment of the apparatus according to the invention.

FIG. 4 relates to an embodiment of the apparatus according to the invention, in which the control/evaluation unit 13, by means of a connection 10, is displaced from a housing 8, in which the detector unit 12 is located. Otherwise the construction of this embodiment is essentially consistent with the embodiment shown in FIG. 2.

Figure 5:
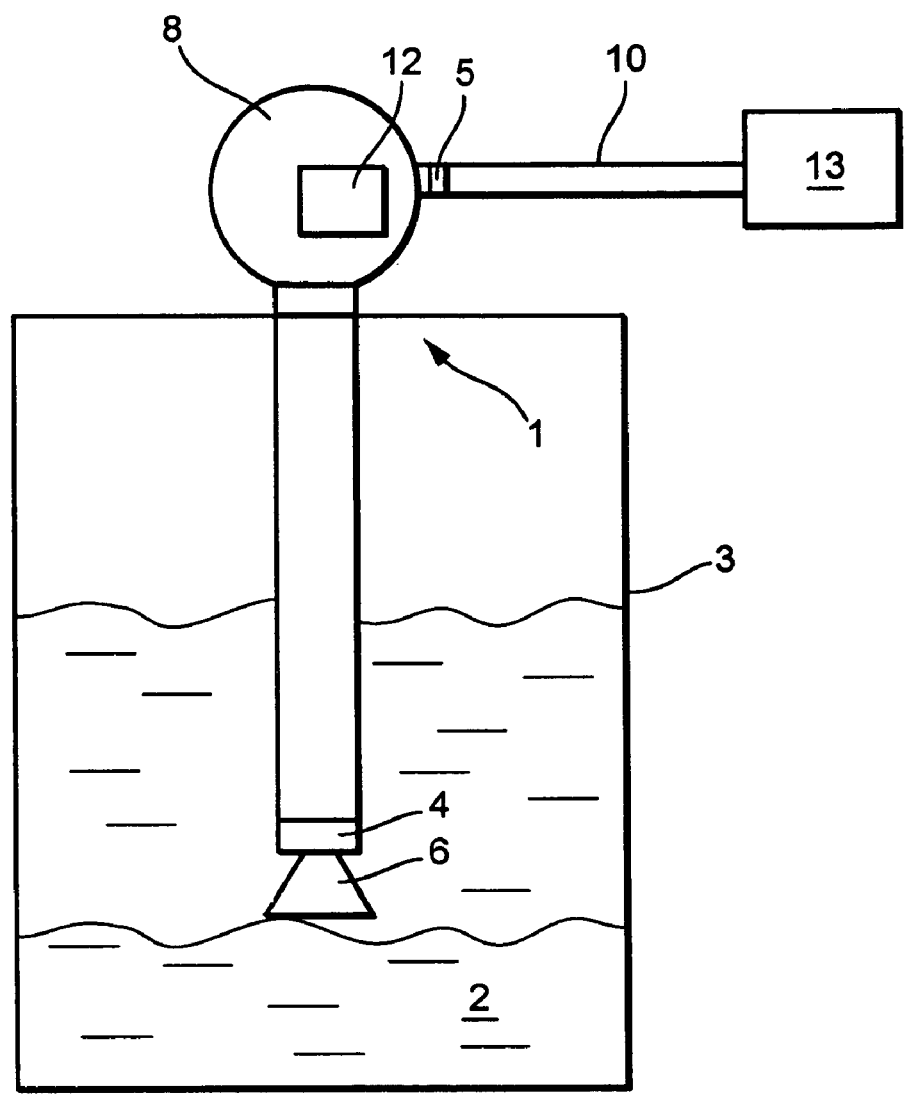
FIG. 5: a schematic representation of a fifth embodiment of the apparatus according to the invention.

The embodiment of the apparatus of the invention described in FIG. 5 differs from the embodiment of FIG. 4 solely in that the second sealing stage 5 is arranged between the housing 8 with integrated detector unit 12 and the control/evaluation unit 13. In FIG. 5, the second sealing stage 5 is arranged behind the detector unit 12. The difference here is that in the case of the embodiment shown in FIG. 4, the second sealing stage 5 is arranged in front of the detector unit 12.

Figure 6:
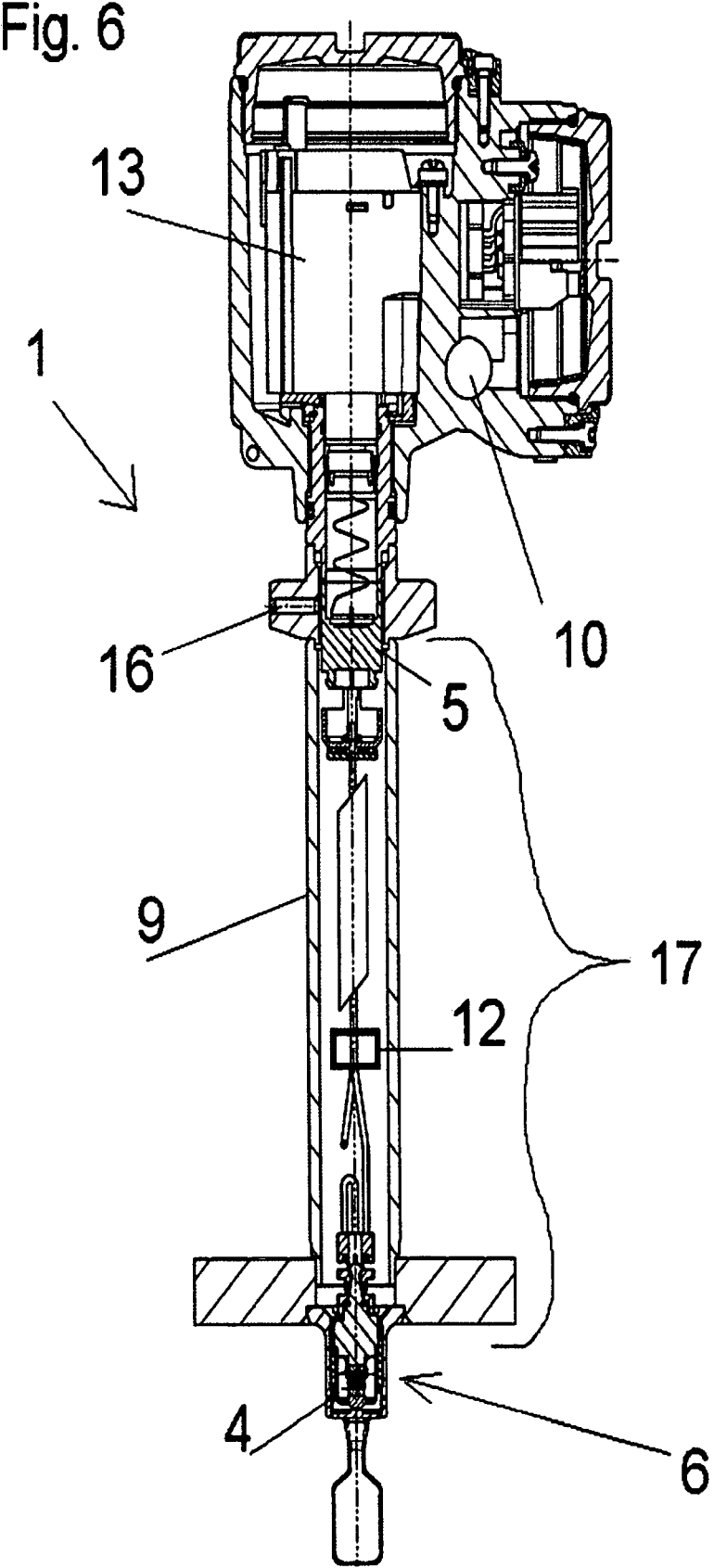
FIG. 6: a schematic representation of a sixth embodiment of the apparatus according to the invention.

FIG. 6 shows in greater detail, by way of example, one way in which the principles of FIG. 3 can be carried out. Field device 1 of FIG. 6 is a vibration detector. The first sealing stage 4 is located near the sensor 6, toward the process. The sensor 6 and the control/evaluation unit 13 are connected with each other through the connecting tube 9, in which the detector unit 12 is located. The connecting tube 9 is placed e.g under positive pressure by utilization of the bore 16, preferably with a protective gas such as argon. This bore is subsequently sealed using a threaded plug, which can additionally be welded. The positive pressure is subsequently monitored by means of the detector unit 12, e.g. a pressure switch. If a leakage results at the first sealing stage 4, then the positive pressure will decrease. This leads immediately to an alarm, without e.g. a gas or the medium penetrating into the actual electronics housing. In particular, the detector unit 12 can also consist of a mechanical switch, which requires no further supply lines. Then, with this switch, the sensor supply lines can be interrupted or short-circuited. Both cases are usable as clear error conditions. The advantage of this solution is its simple and inexpensive implementation. However, separate lines for supplying the detector unit can also be used in order to permit more sophisticated solutions. The first sealing stage 4, the second sealing stage 5, the detector unit 12, and the connecting tube 9 here form the modular unit 17. An alternative embodiment is that two additional seals seal only a part of the connecting tube 9 in which the detector unit 12 is located, and that then only this smaller modular unit 17 is placed under positive pressure. Thereby e.g. the electronics in the control/evaluation unit 13 is not exposed to the positive pressure. A general alternative is that a negative pressure, rather than a positive pressure, is established. In the case of vacuum, then the detector unit 12 is also a vacuum switch.

Figure 7:
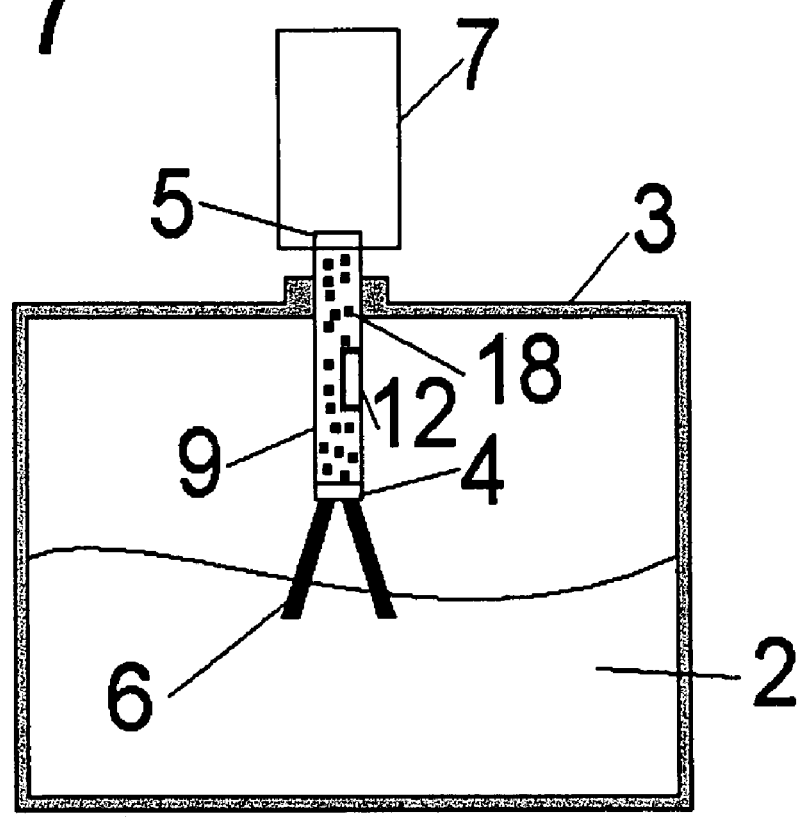
FIG. 7: a schematic representation of a seventh embodiment of the apparatus according to the invention.

FIG. 7 shows an oscillation fork as the sensor 6 which is connected with the transmitter 7 via a connecting tube 9. The joint of the sensor 6 to the connecting tube 9 is sealed using the first sealing stage 4, and the joint of the connecting tube 9 to the transmitter 7 is sealed using the second sealing stage 5. The connecting tube 9 is filled with an intermediate medium 18, which here is a gas. Consequently, the first sealing stage 4 and the second sealing stage 5 are constructed to be gas-tight. Thus, e.g. the second sealing stage 5 can be a familiar glass bushing. The intermediate medium 18 is monitored by the detector unit 12, which in this case, for example, is an optical MEMS-gas sensor. Such a sensor utilizes the fact that most gases have a specific absorption line for infrared light. The sensor 12 measures the transmission of light through the gas. The wavelengths of the absorbed light give information about the gas, and the intensity of the absorbed light enables the determination of the amount of the gas. Using these two pieces of information, it is monitored that the intermediate medium 18 is present, and not, for example, replaced by the penetrating gas from the process medium 2. An advantage of such detector units is also that they are very small, e.g. they fit on a single chip.

The invention claimed is:

1. An apparatus for monitoring a field device for determining and/or monitoring a physical and/or chemical process parameter of a process medium, comprising:
    a first sealing stage facing toward the process medium;
    at least one housing with a predetermined interior volume, which housing is located on the side of said first sealing stage facing away from the process medium;
    said energy interacts with the process medium;
    at least one detector unit is provided in said housing, which unit monitors at least one condition parameter of the interior volume of said housing; and
    a control/evaluation device determines, on the basis of the energy interacting with the process medium, the physical and/or chemical process parameter, wherein:
    energy is transferable through said first sealing stage in the direction of the process medium; and
    said control/evaluation unit and/or another monitoring unit recognizes and/or reports, on the basis of the monitored condition parameter in the interior volume of said housing, whether said sealing stage is sealing said housing against the process, and/or issues an alarm as soon as the monitored condition parameter in the interior volume of said housing reaches a predetermined limit value.

2. The apparatus as claimed in claim 1, further comprising:
    a transmitter, wherein:
    said housing is provided between said first sealing stage and said transmitter, in which at least one electric and/or electronic component of the field device is arranged.

3. The apparatus as claimed in claim 2, wherein:
    said housing and said transmitter, for the incorporation of said at least one electric and/or electronic component of the field device, are connected with each other by a connecting line.

4. The apparatus as claimed in claim 1, further comprising:
    a sensor, wherein:
    said housing separates, or sets apart, said transmitter from said sensor for registering the physical and/or chemical process parameter, or from the process.

5. The apparatus as claimed in claim 4, further comprising:
    a second sealing stage, wherein:
    said first sealing stage is located in the end of said housing facing the process medium; and
    said second sealing stage is provided in the end of said housing that faces away from the process medium.

6. The apparatus as claimed in claim 1, wherein:
    said housing comprises the transmitter, in which the at least one electrical and/or electronic component of the field device is located.

7. The apparatus as claimed in claim 5, further comprising:
    a remote control station, wherein:
    said second sealing stage is arranged between said transmitter and said remote control station.

8. The apparatus as claimed in claim 5, wherein:
    said first sealing stage and/or said second sealing stage is/are gas-tight.

9. The apparatus as claimed in claim 1, further comprising:
    a detector unit, wherein:
    said detector unit is integrated into said housing, said transmitter, or a connecting tube of said housing.

10. The apparatus as claimed in claim 9, wherein:
    said detector unit is embodied as an add-on module, which is adaptable to said housing, said transmitter or said connecting tube.

11. The apparatus as claimed in claim 9, wherein:
    at least one part of said transmitter, said housing or said connecting tube is under negative pressure; and
    said detector unit is one of: a pressure measuring device, a vacuum switch and/or a pressure switch.

12. The apparatus as claimed in claim 9, wherein:
    at least one part of said transmitter, said housing or said connecting tube is under positive pressure; and
    said detector unit is a pressure measuring device and/or a pressure switch.

13. The apparatus as claimed in claim 9, wherein:
    provided in said detector unit is a movable unit, which moves out of a rest position, as soon as the monitored condition parameter inside said transmitter, said housing or said connecting tube reaches a predetermined limit value.

14. The apparatus as claimed in claim 9, wherein:
    a part of said transmitter, said housing or said connecting tube and said detector unit form a modular unit.

15. The apparatus as claimed in claim 9, wherein:
    present at least in a part of said transmitter, said housing and/or said connecting tube is an intermediate medium, which differs from media present in a container, especially the process medium; and
    said detector unit is embodied such that it monitors the intermediate medium.

16. The apparatus as claimed in claim 15, wherein:
    said intermediate medium comprises a gas; and
    said detector unit comprises a corresponding gas sensor.

* * * * *